United States Patent [19]

Iya et al.

[11] 4,341,749

[45] Jul. 27, 1982

[54] HEATING METHOD FOR SILANE PYROLYSIS REACTOR

[75] Inventors: Sridhar K. Iya, Williamsville; Richard A. Van Slooten, East Aurora; Mark E. Braaten, Tonawanda; James R. Lay, North Tonawanda, all of N.Y.

[73] Assignee: Union Carbide Corporation, Danbury, Conn.

[21] Appl. No.: 292,426

[22] Filed: Aug. 14, 1981

[51] Int. Cl.$^3$ .................. C01B 23/02; C30B 25/10
[52] U.S. Cl. ................................. 423/349; 156/613
[58] Field of Search .................. 423/348, 349, 350; 156/613; 422/245

[56] References Cited

U.S. PATENT DOCUMENTS

| | | | |
|---|---|---|---|
| 2,993,763 | 7/1961 | Lewis | 423/349 |
| 3,012,861 | 12/1961 | Ling | 23/223.5 |
| 3,014,791 | 12/1961 | Benzing et al. | 423/348 X |
| 4,084,024 | 4/1978 | Schumacher | 427/215 |
| 4,092,446 | 5/1978 | Padovani et al. | 427/213 |
| 4,207,360 | 6/1980 | Padovani et al. | 427/213 |

FOREIGN PATENT DOCUMENTS 1128412  4/1962  Fed. Rep. of Germany ...... 423/349

OTHER PUBLICATIONS

Eversteyn, E. C. et al., "J. Electrochem. Soc.", vol. 117, 1970, p. 925.

*Primary Examiner*—G. O. Peters
*Attorney, Agent, or Firm*—Frederick J. McCarthy, Jr.

[57] ABSTRACT

An improved method for the pyrolysis of silane in a free-space reactor. The improved method involves non-uniform heat input along the axial length of a free-space silane pyrolysis reactor so that the axial temperature profile along the length of the surrounding reactor wall is essentially constant.

3 Claims, 12 Drawing Figures

HEATING METHOD FOR SILANE PYROLYSIS REACTOR

INTRODUCTION

This invention relates to an improved method for the pyrolysis of silane in a free space-reactor. The improved method involves non-uniform heat input to a free space silane pyrolysis reactor so that the axial temperature profile along the reactor wall is essentially constant. The non-uniform heat input involves increased heat input at an intermediate section of the reactor and which enhances the fluid convective heat transfer effects within the reactor. The improved method enables efficient silane pyrolysis to form silicon powder without significant deposition of silicon on the reactor wall.

BACKGROUND OF THE INVENTION

A known process for ultrahigh purity silicon production involves the upgrading of metallurgical grade silicon feedstock to an ultrahigh purity silicon powder product. The process involves three distinct components, i.e., a hydrogenation subsection, a redistribution reactor and column subsection, and a silane pyrolysis and silicon powder consolidation subsection. The hydrogenation subsection involves the reaction of the metallurgical grade feedstock with recycle silicon tetrachloride and hydrogen to produce an intermediate chlorosilane product; during such procedure heavy waste materials including many of the metallurgical impurities are removed as a sludge waste stream. The trichlorosilane containing feedstock is then passed to a middle reactor and column section whereby a combination of reactors containing resin catalyst and distillation columns are utilized to upgrade the chlorosilane to an ultrahigh purity silane product and a recycle tetrachloride stream. The final subsection of the process utilizes the ultrahigh purity silane to produce the ultrahigh purity silicon product material, e.g., the silane feedstock material can be pyrolyzed utilizing homogeneous decomposition reaction of the silane in a free space reactor. Such a reactor involves the turbulent injection of the silane feedstock with suitable applied heat so that the silane is decomposed to hydrogen and silicon powder. The hydrogen is removed from the reactor and recycled back to the hydrogenation section and the powder can then be consolidated into a readily handleable form.

A prior art free-space reactor apparatus is described in U.S. patent application Ser. No. 902,562 filed May 3, 1978 which is incorporated herein by reference. The above-noted prior art reactor involves a cylindrical vessel and an axially centered nozzle for introduction of silane gas as shown in FIG. 1 of the present patent application. The prior art reactor comprises a vertical cylindrical vessel with an inner quartz liner and a circumferential array of uniformly spaced induction coils on the outside for heating purposes. The arrangement also includes a suitable nozzle placed on the central axis of the reactor to introduce the silane, and suitable reactor heads for necessary stream connections. The reactor head includes a water cooled jacket. Another feature is a pneumatically operated scraper which used to remove soft silicon powder from the wall.

Early testing with the prior art FIG. 1 apparatus indicated the basic operational feasibility for the free space reactor and further work lead to the discovery of several problems. Temperature instrumentation indicated an essentially parabolic temperature profile along the axial length of the reactor as shown in FIG. 2 of the present application. This non-uniform temperature profile resulted in the formation of considerable hard silicon deposits on the reactor wall at the silane inlet end of the reactor. These silicon deposits could not be readily removed with the scraper arrangement and often led to quartz liner failure. Additionally, examination of the reactor following experimentation indicated that silane gas had migrated between the liner and reactor walls and caused corrosive attack on the reactor wall.

Analysis of the experiments indicated unsuitability of the above-noted prior art free space reactor and an improved heating method and apparatus arrangement is provided which is the subject of the present invention.

SUMMARY OF THE INVENTION

This invention relates to an improved heating method for a free space silane pyrolysis reactor. The improvement involves a non-uniform heat input along the axial length of the reactor to provide an essentially constant axial temperature profile along the reactor wall and thereby provide improved control of the silane, pyrolysis reaction, i.e., the decomposition of silane, $SiH_4$ to silicon in very fine size, and hydrogen gas.

A process in accordance with the present invention produces silicon powder by thermally decomposing silane gas in a heated free-space reaction zone of a decomposition reactor and includes the steps of (i) introducing a turbulent jet of silane gas into a free-space reaction zone extending a desired length along the central axis of a substantially cylindrical decomposition reactor surrounding the free-space reaction zone, the jet of silane gas being introduced along the central axis of the reactor into said free-space reaction zone, (ii) applying heat circumferentially to the outer wall of the decomposition reactor surrounding the reaction zone, the heat being sufficient to establish a temperature in said reaction zone sufficient to decompose silane to provide silicon and hydrogen gas, the applied heat being a maximum at the circumferential location surrounding the introduction of the jet of silane into the reaction zone and decreasing substantially linearly along the length of the reaction zone with the heat applied circumferentially at the end of the reaction zone being about 30 to 50% of the maximum applied heat.

The reactor used in the practice of the present invention is a cylindrical cross-section vessel that utilizes a central axis injection nozzle adjacent one end for the silane jet gas feed. The silane gas feed is introduced through the nozzle as a turbulent jet stream. The entering silane stream is mixed with heated recirculating gases within the reactor and the silane is caused to decompose homogeneously to silicon product in the form of fine particles and by-product hydrogen gas. The fluid flow pattern within the reactor can be described relative to the fluid jet reattachment point, or length, with a generally recirculating gas flow pattern upstream of such point, and a generally forward pipe flow gas pattern beyond that point. The exit flow from the reactor is the combined spent hydrogen stream and the suspended fine sized silicon powder product. Calculational techniques for determining the fluid jet reattachment point, or length, lr as herein identified, are available in Khalil, Spaulding, and Whitelaw, "The Calculation of Local Flow Properties in Two-Dimensional Furnaces", International Journal of Heat and Mass Transfer, Volume 18, pp. 775-791, 1975 and Jensen et al., "Computation of Structures of Flames with Recirculating Flow and Radial Pressure Gradients", Combustion and Flames, Volume 34, pp. 309-326, 1979. In the practice of the present invention, the desired fluid jet reattachment length, lr, is about 2.5 times the inner diameter of the reactor.

The desirable constant axial temperature profile along the length of the reaction zone is associated with the reactor wall length from the vicinity of the injection nozzle to the fluid jet reattachment point, lr. This portion of the reactor length can be considered to be the reaction zone and the reactor wall length in this zone should be maintained at a substantially uniform, i.e., constant operating temperature sufficient to decompose silane, but below the temperature which will cause melting of silicon product, e.g., about 800° C. to 1000° C. The opposite ends of the reactor are preferably maintained at ambient temperature, e.g., about 100° C. to 200° C. and accordingly the reactor wall temperature decreases at each end from the maximum reaction zone temperature to ambient temperature. The overall reactor length can be considered as being subdivided into three axial temperature zones. The silane inlet zone has a steeply increasing temperature profile having about ambient, e.g., about 100° C. to 200° C. to the operating temperature. The middle zone, the reaction zone, has an essentially axially constant reactor wall temperature, e.g., in the range of 800° C. to 1000° C. The outlet zone has a decreasing temperature profile from the maximum operating temperature to about the ambient temperature.

In order to maintain the above-noted substantially uniform axial temperature profile it is necessary to maintain a non-uniform axial heat input to the reactor. Maximum unit heat input is applied immediately downstream of the silane nozzle inlet with substantially linearly decreasing unit heat input (heat flow per unit reactor length) towards the fluid jet reattachment point, lr. Generally, the unit heat input will range from a maximum at the inlet end axial position adjacent the nozzle to about 30% to 50% of the maximum at about the jet reattachment point, i.e., about the reactor axial midpoint. The unit heat input pattern is substantially linearly decreasing between these points. Remaining reactor length is generally heated at about 20 to 40% of the maximum unit heat input.

The unit heat input variation can be provided by either a suitable non-uniform induction coil array arranged along the axial length of the reactor, or by separately controlled electrical resistance heaters. With such a heating arrangement, the applied heat is adjusted until the temperature in the free-space reaction zone is in the range of about 800° C. to 1000° C. to provide the desired constant temperature along the reactor wall surrounding the reaction zone. Additionally, the reactor would advantageously utilize a purged quartz liner which is spring loaded with suitable seals at the ends. Such arrangement prevents the migration of silane from the reactor space to the metal reactor walls and thereby prevents corrosion of the reactor. The suitable reactor geometry can range from small laboratory scale units to full-scale commercial units. Expected reactor dimensions and process conditions are outlined in Table 2 hereinbelow with reference to FIG. 12 illustrating the reactor parameters.

DESCRIPTION

The present invention concerns an improved heating method for a free-space silane pyrolysis reactor. In particular, the improvement is concerned with a non-uniform heat input along the axial length of the reactor to provide a constant temperature along the reactor wall.

FIGS. 9(a)-(c) illustrates a typical axial unit heat input profile for a non-uniform heated reactor in accordance with the present invention.

Figure 10:
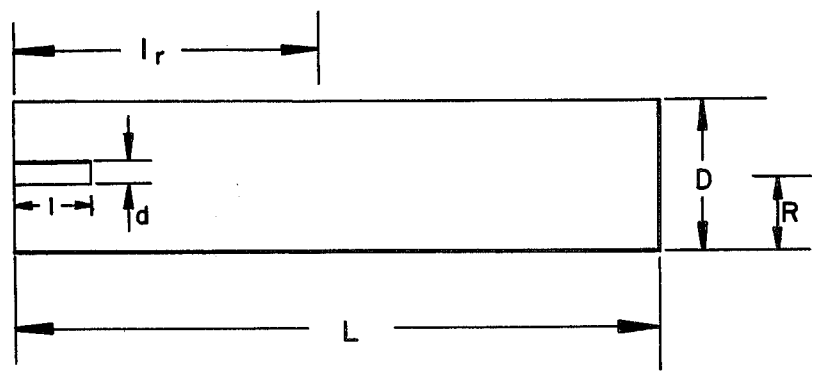

FIG. 10 shows schematically the relevant parameters for a free-space reactor in accordance with the present invention.

Figure 11:
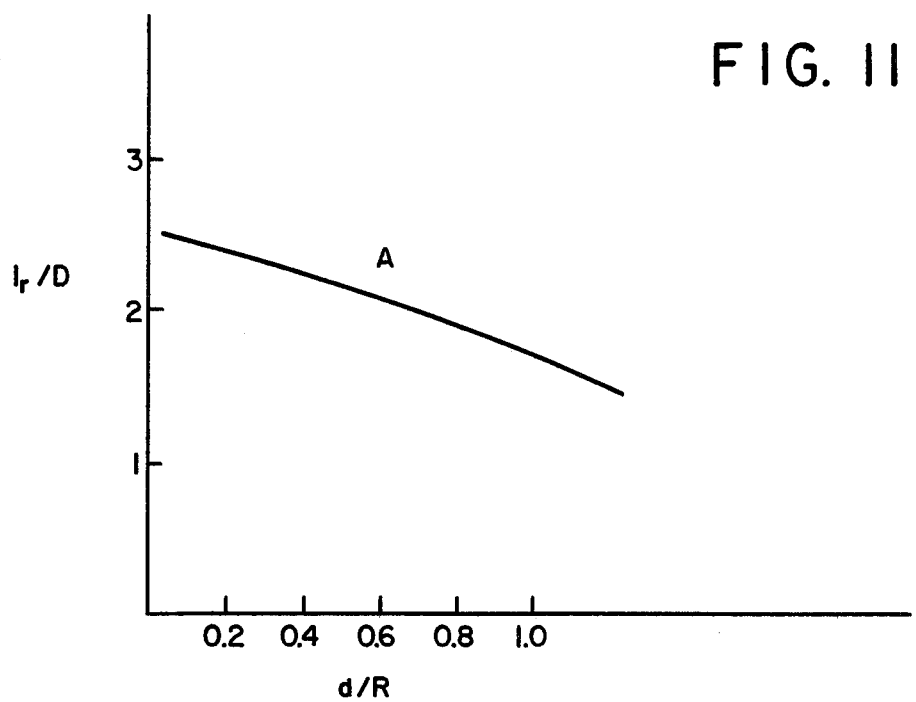
Figure 12:
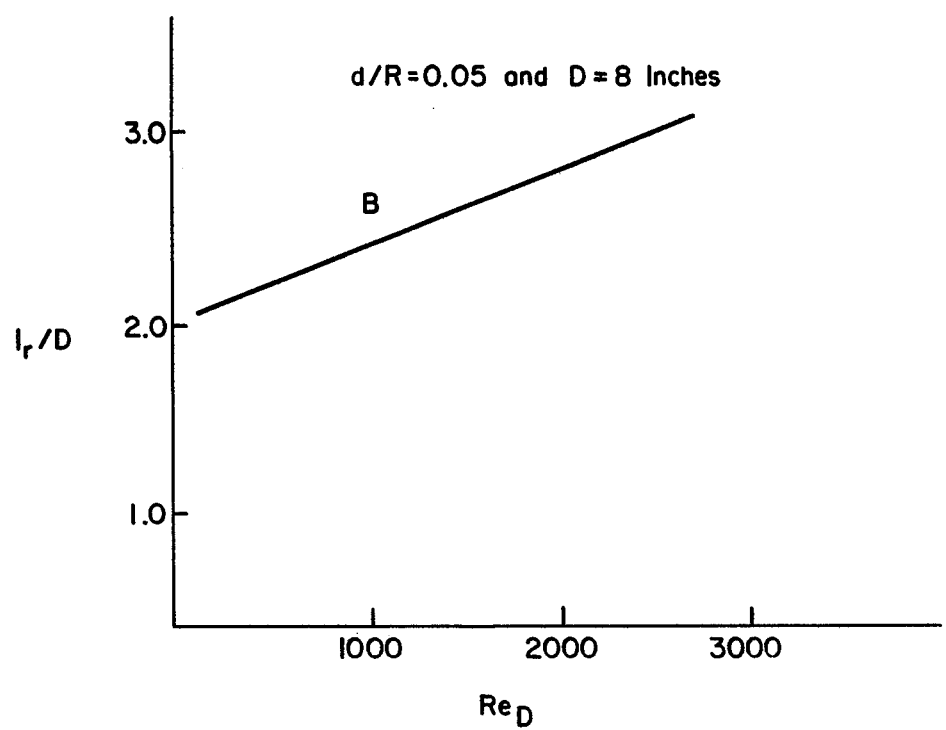

FIGS. 11 and 12 show graphs relating certain of the parameters for a free space reactor in accordance with the present invention.

Figure 1:
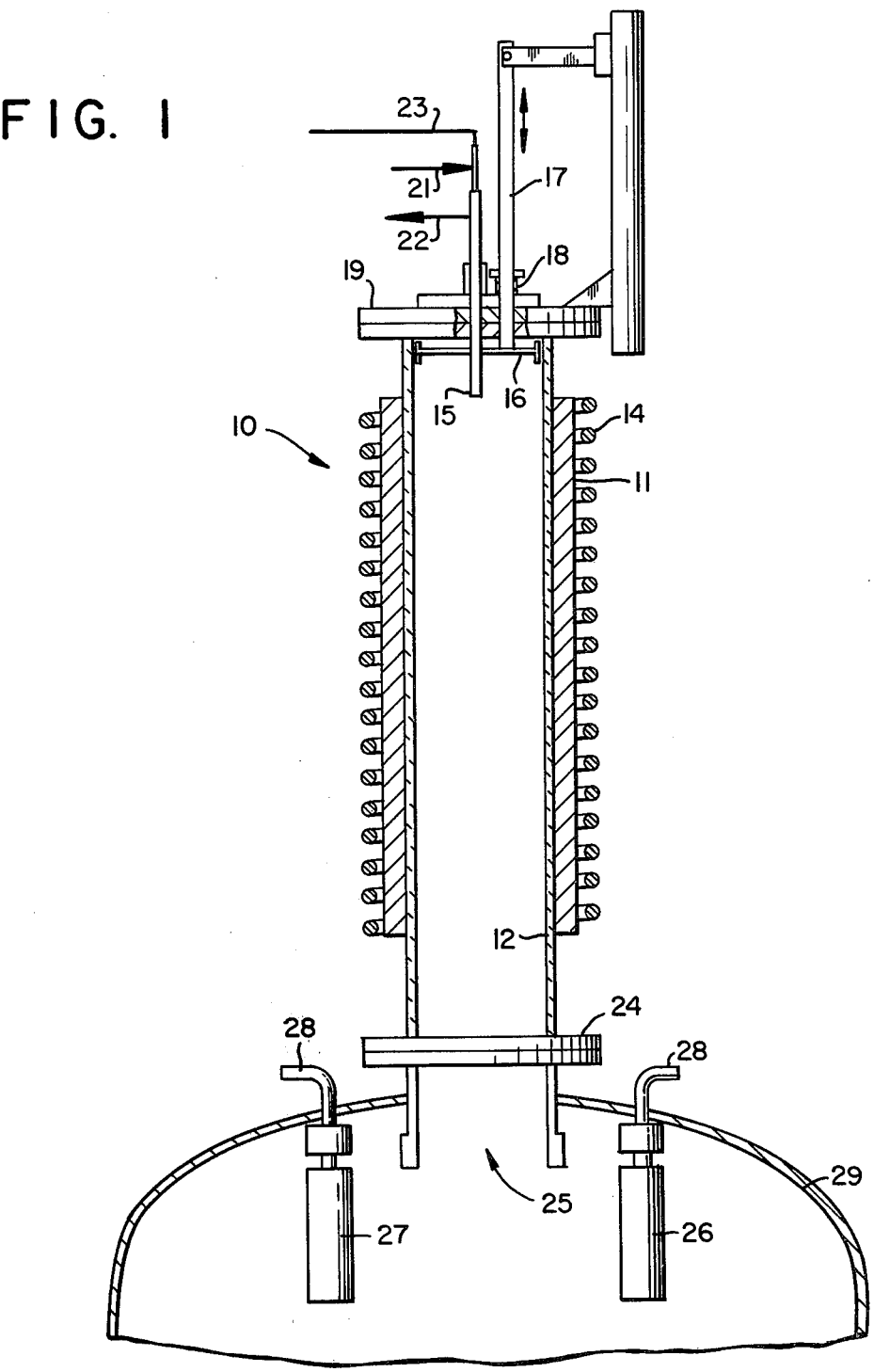
FIG. 1 illustrates a prior art free-space reactor.

With reference to the prior art free-space reactor of FIG. 1, indicated at 10, the device includes a vertical cylindrical metal reactor 11 formed for example of Incoloy specialty material. This reactor includes a quartz liner 12 internal to the reactor which is intended to protect the reactor walls and maintain the purity of the produced silicon powder by avoiding contact with the metal walls. The reactor includes an central axis injection nozzle 15 for the silane feedstock 23 and further includes a pneumatically operated arrangement 16 including, pivoted arm 17 and seal 18, that can be moved along the axial length of the reactor and remove any silicon powder that may deposit on the quartz liner walls. The reactor head 19 supports the inlet nozzle 15 and scraper 16 and includes cooling water lines 21, 22 to maintain low equipment temperatures at the top of the reactor. The bottom 25 of the reactor is open so that the decomposition products of the reaction, that is the hydrogen gas and the silicon powder can flow from the reactor 10. The reactor is mounted on a silicon powder hopper 29 which is used to hold the resultant product and also contain suitable porous metal filters 26, 27 which can be used to remove the hydrogen offgas at 28 from the reaction. As seen from the drawing, the prior art reactor includes means for uniform applied heat input along the axial length of the reactor in that the induction coil 14 utilized to introduce the heat is uniformly spaced along the axial length. Although the uniform spaced coil generates uniform heat input along the reactor wall along most of its length, magnetic field end effects will result in somewhat lower heat generation at each end.

Initial experimental work with the prior art equipment illustrated in FIG. 1 was satisfactory in some respects; however further test work indicated several problems. During some of the test runs, shown in Table 1, Test 1, hereinbelow, it was not possible to operate the scraper mechanism because of apparent binding within the reactor. Subsequent examination indicated that the scraper mechanism would not operate because of binding on the quartz liner due to hard silicon depositions at the top of the liner. For some runs, attempts to operate the scraper mechanism caused breakage of the liner and following termination of the test run pieces of the liner were found in the silicon product hopper. Further, examination of the reactor indicated corrosion on the walls of the reactor. Test runs with the prior art equipment as shown in FIG. 1 indicated a parabolic temperature profile as shown on attached FIG. 2 where essentially the highest temperature was obtained at the midpoint of the reactor with low temperatures at either end. Testing of the resultant powder had further indicated substantial contamination of the powder with various metallic impurities.

Figure 2:
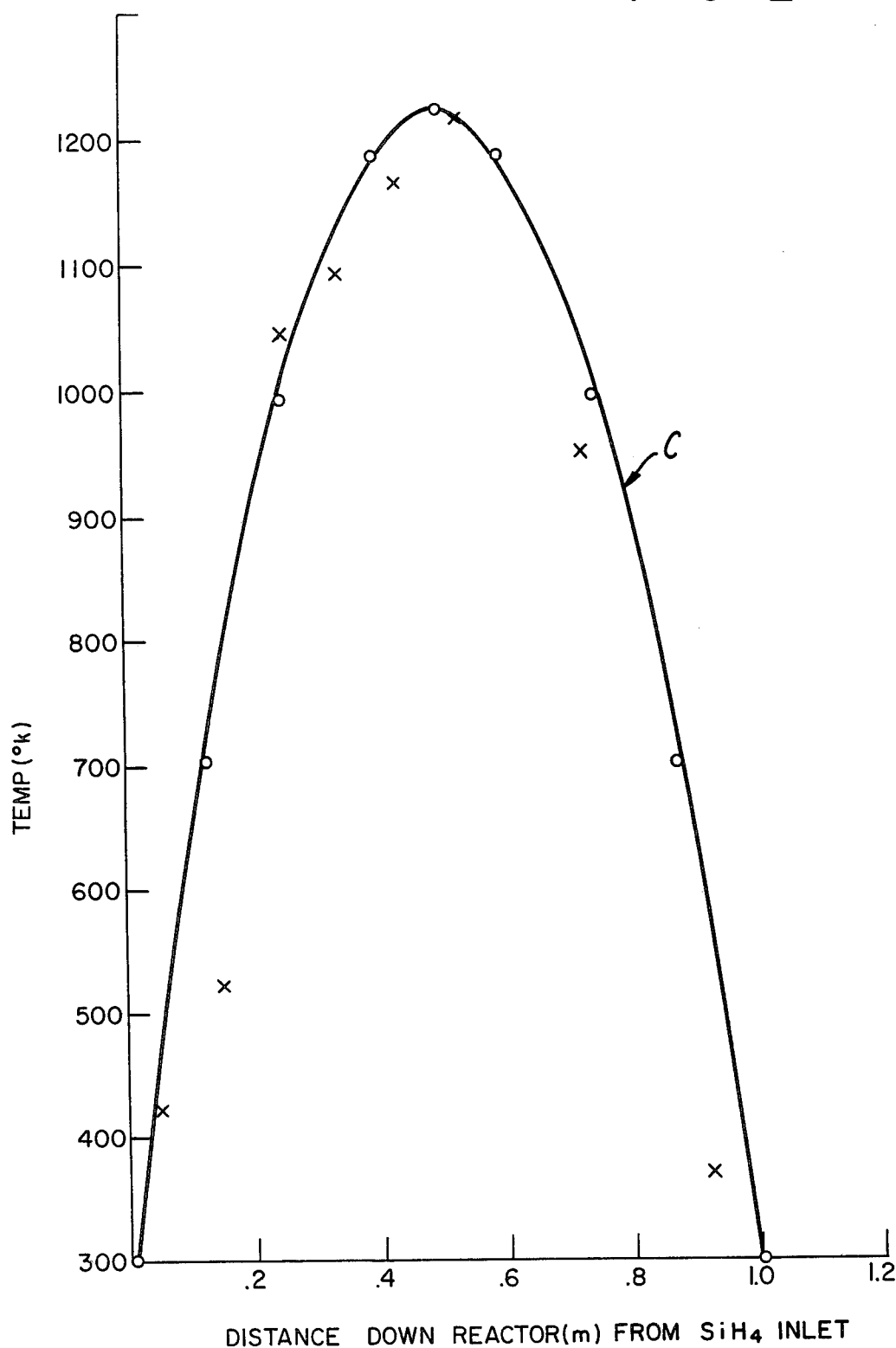
FIG. 2 illustrates the non-uniform axial temperature profile associated with the prior art reactor.
Figure 3:
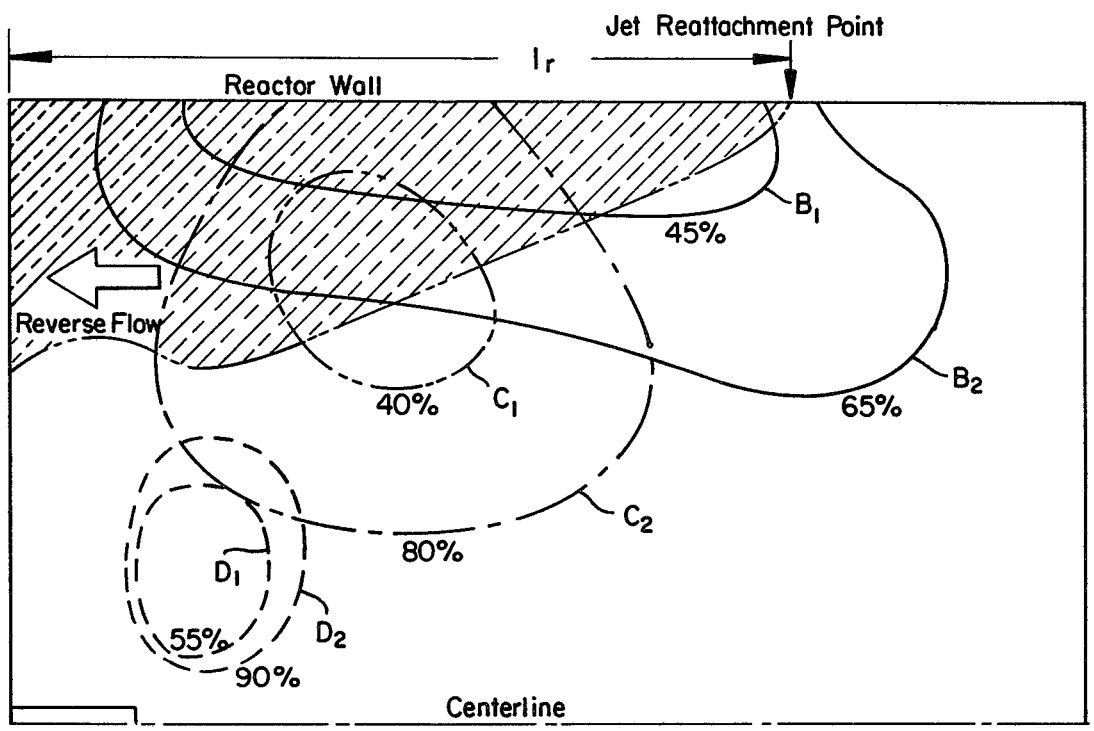
FIG. 3 illustrates calculated reactor performance which indicates satisfactory performance at high throughputs with a uniform axial temperature reactor in accordance with the present invention.

It was expected that the reaction in the prior art apparatus of FIG. 1 would be such that the homogeneous decomposition of the inlet silane would occur within the space near the inlet nozzle. The necessary heat for this reaction was to be transferred from the wall to the incoming silane gas by the recirculating gas stream in the reactor. Following the unsuccessful experimental tests, computer modeling of the reactor indicated that the parabolic temperature profile of the FIG. 1 apparatus as illustrated in FIG. 2 and substantially repeated by the model calculated Curve C was not satisfactory from a silane pyrolysis standpoint. As shown in attached FIG. 3, the computer model indicated that a parabolic wall temperature profile results in substantial undesirable heterogenous decomposition of silane on the walls of the reactor. The calculated curves indicated in FIG. 3 illustrate the effect of both parabolic and uniform reactor wall temperature profiles and the impact of silane throughput. Each curve indicates the region that corresponds to a given degree of silane feed decomposition. The heterogeneous decomposition of the silane on the reactor wall essentially caused the problems with the initial tests (Curves B1, B2). As the computer modeling showed, lower throughput (Curves C1, C2) with the parabolic temperature profile lead to improved reaction but still some decomposition on the wall. It is only when the wall temperature surrounding the reaction zone is maintained substantially constant that the reaction is substantially completely contained within the gas space of the reactor and thereby avoid silicon formation on the wall surfaces (Curves D1, D2). This discovery led to the present invention.

It is apparent from FIG. 3 that a free-space silane pyrolysis reactor would not operate satisfactorily unless the heat input arrangement is configured so as to maintain substantially constant wall temperature surrounding the reaction zone. The calculations represented in FIG. 3 show that in order to maintain a constant wall temperature as is desirable from the reaction standpoint, it is necessary to maintain non-uniform heat input into the reactor. In particular, it is necessary to maintain increased heat input at the silane inlet end since the gas flow patterns associated with the recirculating jet flow resulting from the inlet nozzle resulted in additional convective heat transfer from the wall and additional heat input was required to maintain a desired high temperature at that point. On the other hand, as the gas flow continued along the axial length of the reactor, less applied heat input is required to maintain the constant reactor wall temperature.

Figure 4:
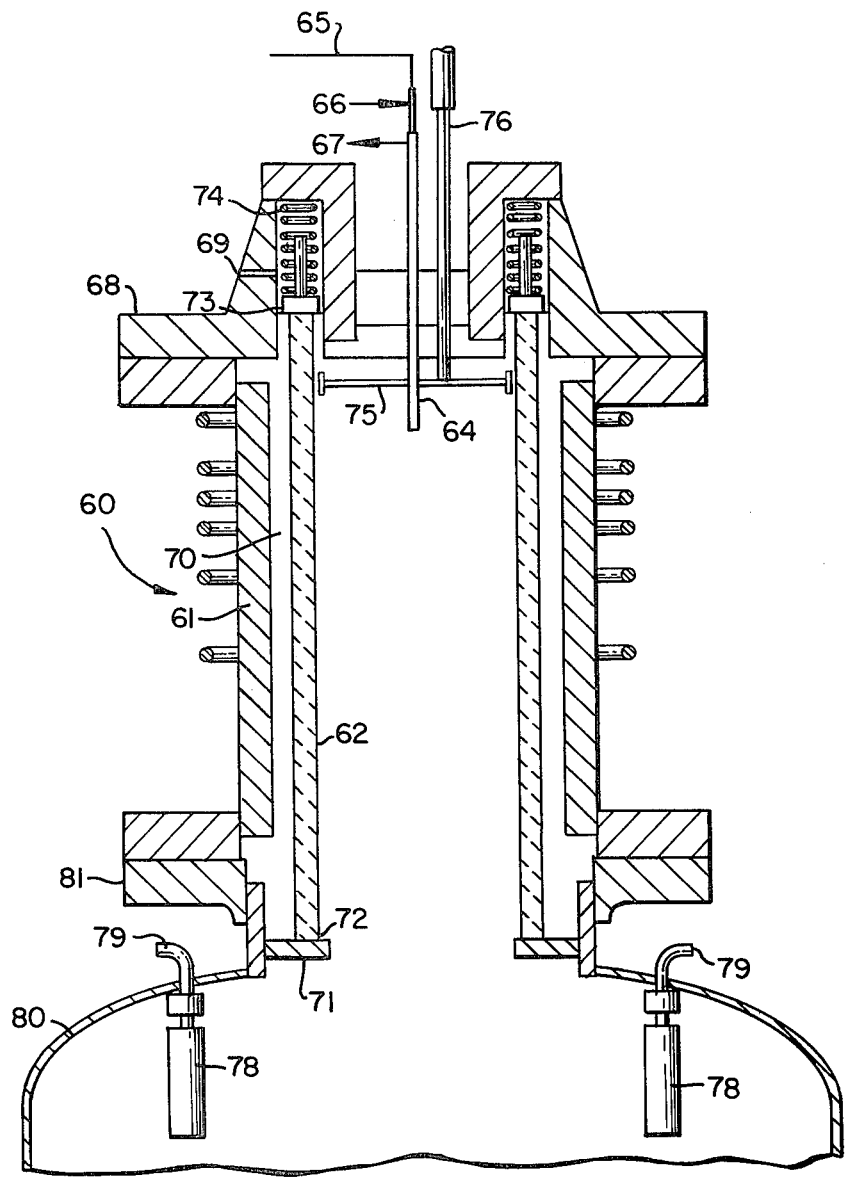
FIG. 4 illustrates a free-space reactor with the non-uniform axially spaced induction coil heaters in accordance with the present invention.

A free-space reactor enabling non-uniform axial heat input in accordance with the present invention is illustrated at 60 in FIG. 4. In FIG. 4 the vertical metal cylinder 61 is mounted at 81 on the hopper 80 for collecting the product silicon powder. The silane turbulent jet feed 65 is introduced through central axis nozzle 64, decomposed in the reactor zone, and the hydrogen offgas 79 is removed through suitable filters 77, 78. The quartz inner liner 62 is supported at 71 and sealed on both ends 72, 73 with suitable high temperature material by spring means 74 within top header 68. The quartz liner can be periodically cleaned of powder by scraper 75 operated by air cylinder mechanism 76. The annular gap 70 between the metal wall 61 and quartz liner 62 can be purged by stream 69 which can be any non-reactive gas but is preferably the offgas hydrogen 79. Such purging prevents the silane feed from corroding the metal reactor walls.

Figure 5:
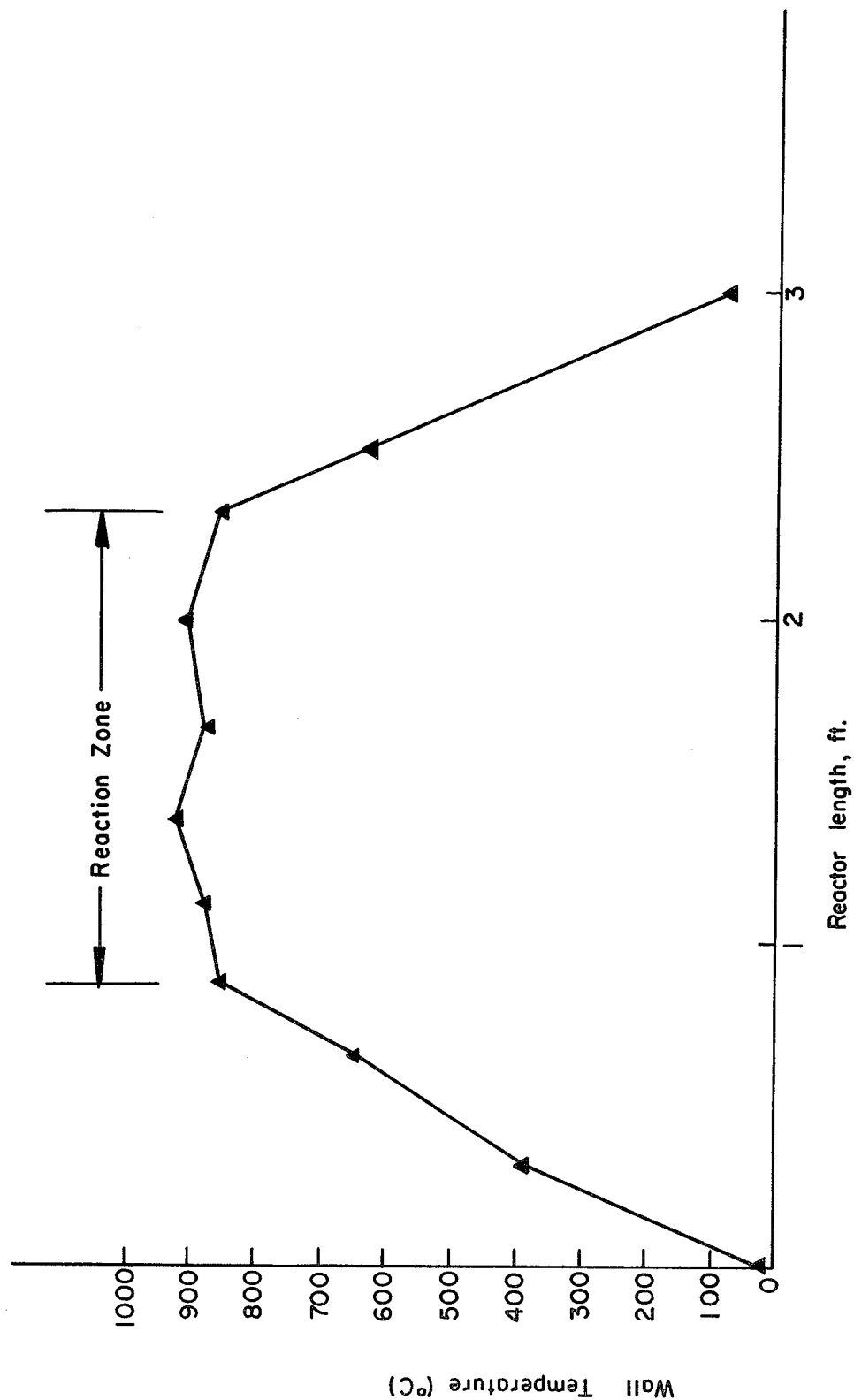
FIG. 5 illustrates the measured axial temperature profile with the non-uniform induction coil apparatus in accordance with the present invention.

The reactor heat input is provided by means of non-uniformly spaced induction coil array 63. Such non-uniform axial spacing of the coils is designed in accordance with known techniques to input increased heat at the input end of the reaction zone. Experimental testing has shown that the reactor has an improved axial temperature pattern as illustrated in FIG. 5 which shows a measured axial temperature pattern that is substantially constant, i.e., uniform. Reactor tests with the non-uniform coil array indicated satisfactory operation without any significant hard silicon wall deposits (Table 1, Tests 2-4). The graph of FIG. 5 was obtained for Table 1, Test 2 conditions.

Figure 6:
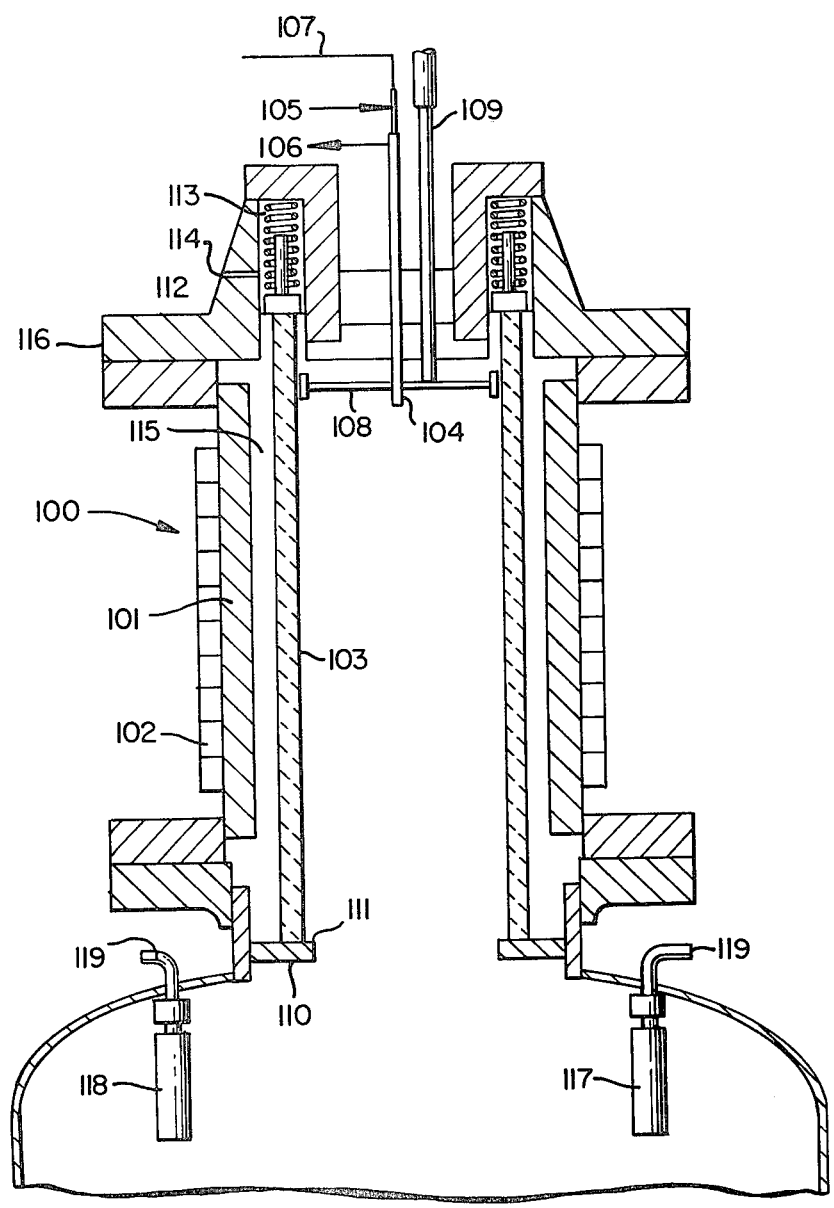
FIG. 6 illustrates a free space reactor in accordance with the present invention with resistance heaters that can be utilized for non-uniform axial heat input.

Another embodiment in accordance with the present invention for axially non-uniform heat input to the free space reactor is illustrated at 100 in FIG. 6 in cross-section. As shown, this arrangement includes an inner quartz liner 103 utilized to maintain the purity of the silicon product and prevent silane attack on the reactor wall. This quartz liner is spaced at 115 from the reactor wall 101 and the annular space is purged at 114. The quartz liner is supported at 110 and sealed at top 112 and bottom 111 by an appropriate spring means 113 within top head 116. The seals are intended to prevent gas flow between the reactor zone and annular purge space and thereby prevent reactor wall corrosion by the silane. Although not shown, the purge gas can enter the top of the purge space, flow downward between the quartz liner and reactor wall and exit to the gas space of storage hopper 120. The quartz liner can be periodically cleaned by scraper 108 actuated by mechanism 109.

The silane feed 107 enters through central axis nozzle 104, is decomposed, and the hydrogen and silicon powder flow into storage hopper 120. The hydrogen gas 119 is removed through filters 117, 118. The reactor walls 101 are heated by resistive electrical heaters 102 placed adjacent to the metal wall. The axial length of the reactor is heated with separate, electrically isolated electrical heaters so that the heat input per unit of axial length can be can be controlled separately to provide the desired non-uniform heat input along the wall of the reactor surrounding the reaction zone in accordance with the present invention.

Figure 7:
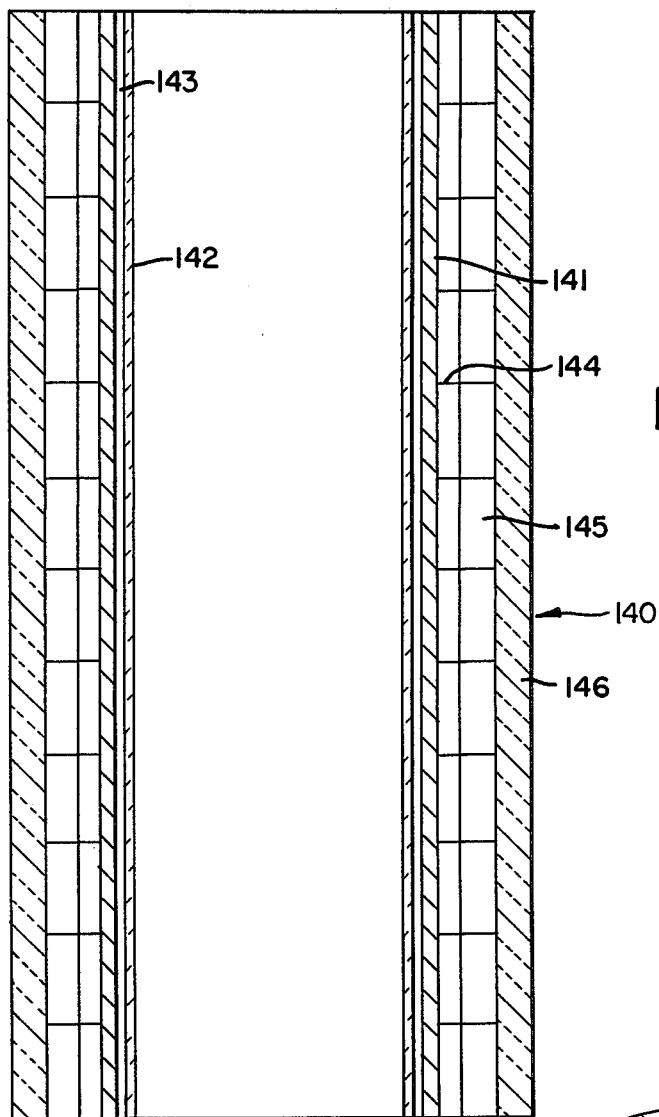
FIG. 7 illustrates a side view of a preferred resistance heater apparatus.

Details of the resistance heater embodiment are illustrated in FIG. 7. The arrangement 140 shows the inner quartz liner 142, the purge space 143, and the metal reactor wall 141. The heater arrangement includes inner reflective baffles 144, e.g., made of stainless steel which axially divide the individual insulated heating elements 145 that form the overall heater unit for the reactor. Such arrangement allows each heating element to be controlled separately with minimal effect on adjacent heaters. This arrangement allows each heating element (or group of elements) to be controlled separately to provide applied heat to maintain the desired axially constant reactor wall temperature. The heater control can be controlled to be responsive to the measured wall temperature for each reactor length segment. The overall assembly can be included in suitable insulation cover 146.

Figure 8:
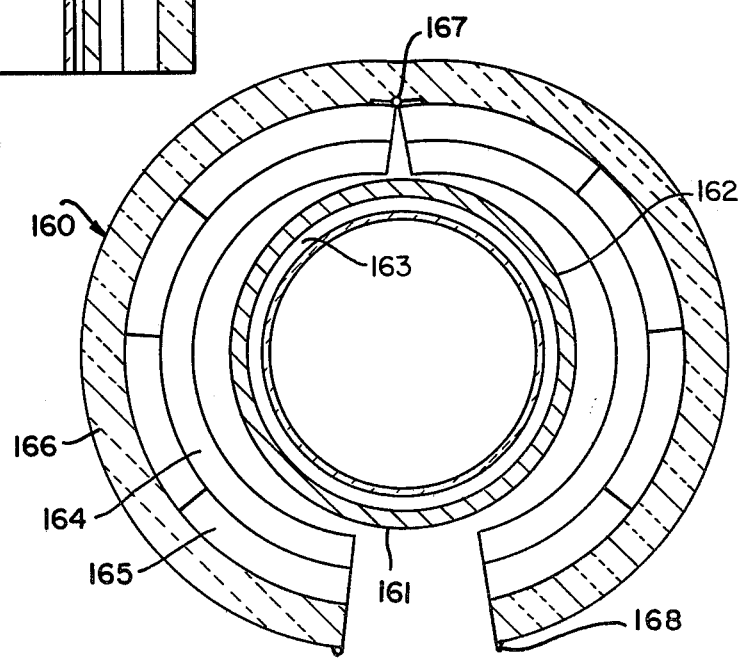
FIG. 8 illustrates a cross-sectional view of the apparatus of FIG. 7.

The same basic arrangement is shown in cross section at 160 of FIG. 8. As shown, the quartz liner 162 is spaced 163 from the reactor wall 161. The reflective baffles 164 are surrounded by the heaters 165 and insulation 166. The overall assembly can be easily installed due to the hinge 167 and latch 168 arrangement.

The desired axial temperature profile along the reactor wall in accordance with the present invention can be related to the expected fluid flow patterns within the reactor. The reactor fluid flow pattern can be described relative to the inlet silane fluid jet reattachment point. Generally, the fluid flow pattern will be recirculating upstream of the jet reattachment point whereas the fluid flow pattern will develop forward pipe flow downstream of the reattachment point. The entering turbulent silane jet will be mixed with the hot recirculating gas and the heated silane will homogeneously decompose within the recirculating fluid flow. Thus the overall reactor length is characterized by a desired midzone reaction zone length as determined by that length from the vicinity of the end of the inlet nozzle and the fluid jet reattachment point, lr, which is generally arranged to be at the reactor axial midpoint. The inlet length of the reactor is that length corresponding to the inlet nozzle length and contributes to the desirable recirculation within the reactor and allows the mixing of the inlet silane with the heated recirculating spent gases. The outlet length of the reactor is the remaining length of reactor associated with the exiting spent gas and product powder flow.

The desired temperature profile along the reactor wall can be described relative to the above-described three reactor length segments. The middle segment on the reaction zone segment requires essentially constant temperature along the reactor wall. The inlet segment involves a steeply increasing temperature profile, since the inlet reactor head is water cooled and thereby maintained at close to ambient temperature, e.g., 100° to 200° C. The outlet segment involves a gradually decreasing temperature from the reaction zone temperature to the ambient temperature associated with the powder storage hopper, e.g., 100° to 200° C. The above outlined reactor temperature profile results in the highly desirable uniform or flat reactor wall temperature in the reaction zone and a suitable drop to essentially ambient conditions at the reactor ends. The reactor inlet end is water cooled in order to maintain the silane feed at non-reactive conditions until it enters the reaction zone. The reaction zone wall length, lr, is maintained at a constant temperature to ensure the desirable heat transfer into the reactor and the substantially complete homogeneous decomposition of the silane feed. The reactor outlet segment or end zone desirably has the decreasing wall temperature profile from the maximum reaction zone level to ambient temperature level. Such decreasing temperature profile is favorable since the fluid at that location should not contain any significant silane but only the spent hydrogen gas and silicon powder product. The decreasing temperature is advantageous in that it serves to cool the silicon powder product and spent gases. The cooled powder should have lesser tendency to pick up impurities from reactor wall. The reactor wall axial temperature profile described above requires non-uniform heat input to the reactor in accordance with the present invention.

Experimentation with the improved apparatus as described above and illustrated in FIG. 4 has indicated that non-uniform heat input to the reactor can substantially improve the performance. Such operation has prevented formation of hard silicon deposits on the quartz liner and thereby allows satisfactory operation of the scraper mechanism. The scraper mechanism is simply an auxiliary feature that serves to remove the loosely adhering powder that may buildup on the wall. Since the powder formed from the homogeneous reaction is extremely fine and does not have good flow characteristics, it is possible for it to buildup on the wall even though it is formed in the gas space itself. The scraper mechanism assures that the material from such buildup can be removed periodically and moved into the silicon product hopper. The test results associated with the apparatus in accordance with the present invention are shown in attached Table 1 as compared to results previously obtained with the prior art apparatus of FIG. 1.

Figure 9:
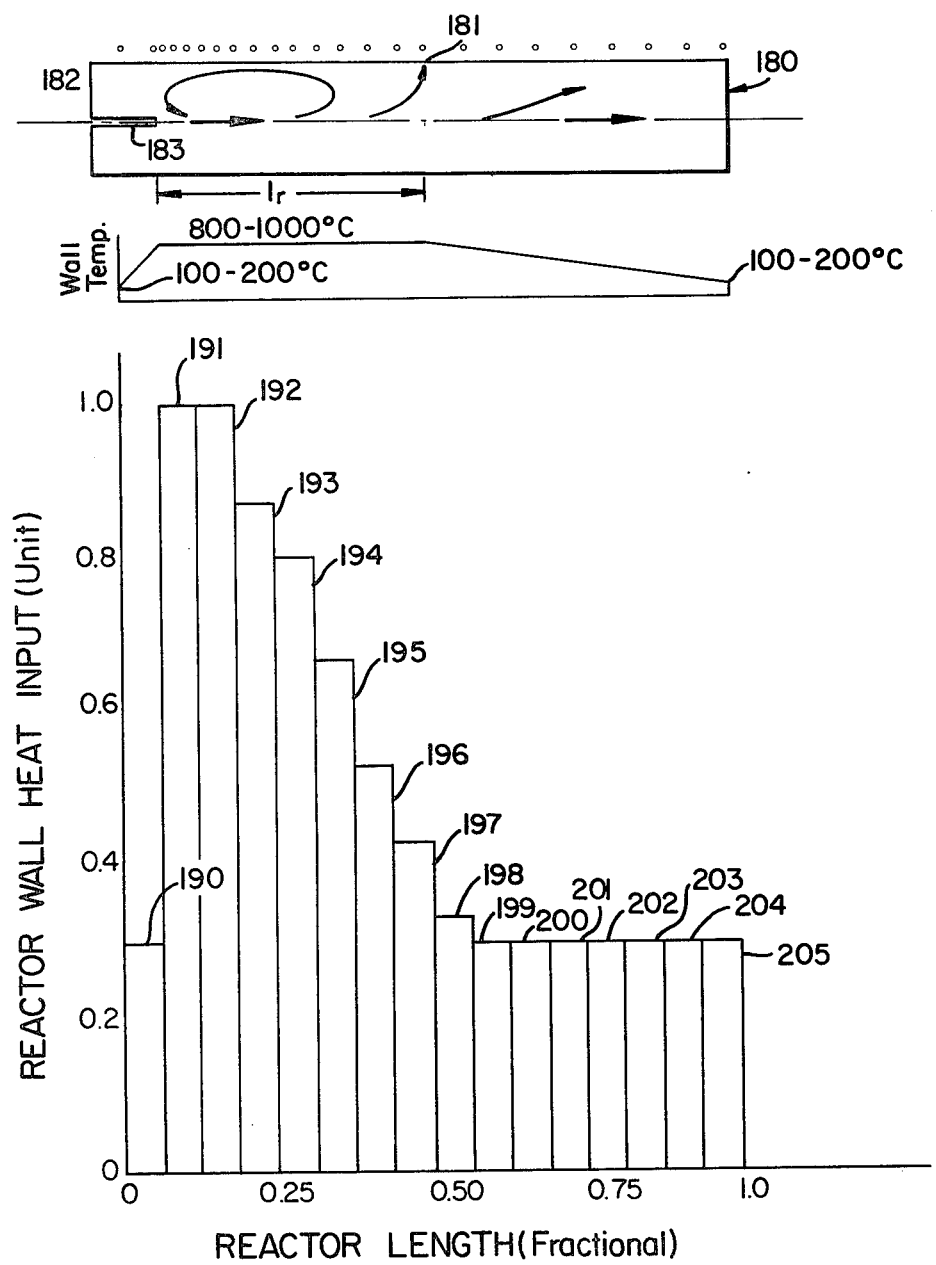

The preferred embodiment of the present invention is to utilize several resistive heaters arranged along the axial length of the reactor. Separate control of each element or groups of elements could then input heat to the reactor wall as needed to maintain the axially uniform temperature profile. FIG. 9 illustrates a desired heat input pattern for such an arrangement.

In order to maintain the axially constant temperature within the reaction zone in the reactor, the heat input has to be non-uniform as above-described. This non-uniformity is related to both reactor fluid flow patterns and reactor end effects. With reference to FIG. 3 the expected fluid flow pattern within the reactor 180 includes the fluid jet reattachment point 181. The silane feed is introduced along the central axis 182 of the reactor through nozzle 183. Generally the fluid flow pattern in the reactor is recirculating upstream of the jet reattachment point whereas it is a forward flow type pattern downstream of the attachment point. Preferably, the reactor throughput and length will be chosen so as to locate the jet attachment point, lr, at about the axial midpoint of the reactor, but in any event within the reactor length.

The typical unit heat input (heat input per unit reactor wall length) pattern for the non-uniform heated free-space reactor in accordance with the present invention is shown in FIG. 9. The diagram of FIG. 9 shows the calculated unit heat inputs on a normalized basis for sixteen reactor length segments (190–205). Due to the recirculating flow pattern, the major portion of the heat input is applied along the reactor length between the inlet nozzle and jet attachment point (segments 191–197). It is estimated that the unit heat input would be at a maximum rate (segment 191, 192) immediately downstream of the inlet nozzle and thereafter decrease in a linear fashion to about 40% of the maximum at the jet attachment point (segment 197). This section of the reactor length, the reaction zone, receives the major portion of the heat input, i.e., about 62% of total heat input for about 44% of reactor length. The average heat input per length for this section is about twice that for the remaining reactor length. Remaining length segments of the reactor, before and after the reaction zone each receive relatively low inputs of about 20 to 40% of the maximum rate.

The improved heating method for the free-space reactor can be practiced for any practical size free-space reactor. The preferred range of reactor dimensions is tabulated for the range of laboratory to commercial size units (Table 2). Generally, it is expected that the operation could be low pressure due to the high operating temperatures. Utilization of the non-uniform heating method would allow maximum reactor throughput at any size.

The definition of parameters for the silane pyrolysis reactor is shown in FIG. 10. As shown schematically, it is preferred that the nozzle diameter be small relative to the reactor diameter with typical nozzle diameter to reactor radius ratios less than about 0.1. The fluid reattachment length can be about one half the total reactor length that is 5 to 6 reactor (inner) diameters. Preferred reactor length is about 4 reactor diameters. Accordingly, the fluid reattachment length, $l_r$, will be retained within the reactor if the reactor length is equivalent to about three reactor diameters.

The variation of fluid reattachment length with reactor geometry and throughput is illustrated on FIGS. 11 and 12. Curve A of FIG. 12 shows that at low values of nozzle diameter to reactor radius ratios, the fluid reattachment length is about 2.5 times the reactor diameter. Curve B of FIG. 13 shows that the fluid reattachment point does not vary significantly with reactor throughput. The Reynolds number is a direct indication of reactor capacity and Curve B illustrates that a 50% variation in flow results in about a 10% reactor diameter variation in the fluid reattachment point. The Curve B conditions correspond to the experimental test conditions for the silane pyrolysis reactor in accordance with the present invention.

TABLE 1

EXPERIMENTAL TEST RESULTS WITH FREE SPACE SILANE PYROLYSIS REACTOR

| | Test | | | |
|---|---|---|---|---|
| | 1 | 2 | 3 | 4 |
| Reactor Diameter (cm) | 20.3 | 20.3 | 20.3 | 20.3 |
| Length (cm) | 101.6 | 101.6 | 101.6 | 101.6 |
| Nozzle Diameter (cm) | 0.64 | 0.64 | 0.64 | 0.64 |
| Length (cm) | 10.2 | 14.0 | 14.0 | 14.0 |

TABLE 1-continued

EXPERIMENTAL TEST RESULTS WITH FREE SPACE SILANE PYROLYSIS REACTOR

| | Test | | | |
|---|---|---|---|---|
| | 1 | 2 | 3 | 4 |
| Induction Coil Heater | Uniform Spacing | Non-uniform Spacing | Non-uniform Spacing | Non-uniform Spacing |
| Test Duration (Hrs.) | 7.5 | 2.0 | 3.1 | 12.0 |
| Pressure (kpa) Maximum | 142.7 | 138 | 138 | 138 |
| Temperature (°C.) | 850* | 905** | 960** | 950** |
| Silane Flow (kg/hr.) | 2.25 | 3.1 | 2.8 | 2.2 |
| Silicon Wall Deposits | Yes | No | No | No |

*parabolic temperature profile
**constant temperature profile

TABLE 2

REACTOR PARAMETERS

| Reactor Parameter | Range | Preferred |
|---|---|---|
| Dimensions D (ins.) | 8 to 36 | 24 |
| L/D | 3 to 6 | 4 |
| D/d | 20 to 60 | 40 |
| l | $\frac{D}{4}$ to D | $\frac{D}{2}$ |
| Pressure (psia) | 15 to 30 | 20 |
| Temperature (°C.) | 800 to 1000 | 900 |
| Silane Capacity (lb/hr.) | 3 to 300 | 100 |

What is claimed is:

1. In a process for producing silicon powder by thermally decomposing silane gas in a heated free-space reaction zone of a decomposition reactor the improvement which comprises
    (i) introducing a turbulent jet of silane gas into a free-space reaction zone extending a desired length along the central axis of a substantially cylindrical decomposition reactor surrounding said free-space reaction zone, said jet of silane gas being introduced along the central axis of said reactor into said free-space reaction zone,
    (ii) applying heat circumferentially to the outer wall of the decomposition reactor surrounding the reaction zone, said heat being sufficient to establish a temperature in said reaction zone sufficient to decompose silane to provide silicon and hydrogen gas, the applied heat being a maximum at the circumferential location surrounding the introducing of the jet of silane into said reaction zone and decreasing substantially linearly along the length of the reaction zone with the heat applied circumferentially at the end of the reaction zone being about 30 to 50% of the maximum applied heat.

2. A method in accordance with claim 1 wherein the temperature at the outer wall of decomposition reactor surrounding said reaction zone is from about 800° C. to 1000° C.

3. A method in accordance with claim 1 wherein the length of the reactor is between about 3 to 6 times the diameter of the reactor.

* * * * *